US007886149B2

(12) United States Patent
Schnizlein et al.

(10) Patent No.: US 7,886,149 B2
(45) Date of Patent: Feb. 8, 2011

(54) METHOD AND APPARATUS FOR ASSIGNING NETWORK ADDRESSES BASED ON CONNECTION AUTHENTICATION

(75) Inventors: John M. Schnizlein, Fort Washington, MD (US); Ralph Droms, Westford, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/362,857

(22) Filed: Jan. 30, 2009

(65) Prior Publication Data

US 2009/0138619 A1    May 28, 2009

Related U.S. Application Data

(63) Continuation of application No. 09/981,182, filed on Oct. 16, 2001, now Pat. No. 7,502,929.

(51) Int. Cl.
*H04L 9/32* (2006.01)
*H04L 29/06* (2006.01)
*G06F 17/00* (2006.01)
*G06F 15/16* (2006.01)
*G06F 15/177* (2006.01)
*G06F 15/173* (2006.01)

(52) U.S. Cl. .................. 713/168; 713/153; 713/161; 713/162; 726/12; 726/15; 709/202; 709/203; 709/220; 709/224

(58) Field of Classification Search ................ 713/168, 713/153, 161, 162; 726/12, 15; 709/202, 709/203, 220, 224
See application file for complete search history.

(56) References Cited

U.S. PATENT DOCUMENTS 5,572,528 A    11/1996   Shuen (Continued)

FOREIGN PATENT DOCUMENTS

EP    1039724    9/2000

(Continued)

OTHER PUBLICATIONS

Duchow et al., "ACIP: An Access Control and Information Protocol for Ethernetbased Broadband Access Networks," 2006, IEEE, pp. 1-6.

(Continued)

*Primary Examiner*—Aravind K Moorthy
(74) *Attorney, Agent, or Firm*—Hickman Palermo Truong & Becker LLP

(57)    ABSTRACT

Techniques for assigning a network address to a host are based on authentication for a physical connection between the host and an intermediate device. One approach involves receiving first data at the intermediate device from an authentication and authorization server in response to a request for authentication for the physical connection. The first data indicates at least some of authentication and authorization information. A configuration request message from the host is also received at the intermediate device. The configuration request message is for discovering a logical network address for the host. A second message is generated based on the configuration request message and the first data. The second message is sent to a configuration server that provides the logical network address for the host. The configuration server is then able to provide the logical network address based on authorization and authentication information.

26 Claims, 7 Drawing Sheets

U.S. PATENT DOCUMENTS

| | | | |
|---|---|---|---|
| 5,790,548 | A | 8/1998 | Sistanizadeh et al. |
| 5,987,454 | A | 11/1999 | Hobbs |
| 6,067,568 | A | 5/2000 | Li et al. |
| 6,073,172 | A | 6/2000 | Frailong et al. |
| 6,073,178 | A | 6/2000 | Wong et al. |
| 6,091,737 | A | 7/2000 | Hong et al. |
| 6,101,182 | A | 8/2000 | Sistanizadeh et al. |
| 6,101,499 | A | 8/2000 | Ford et al. |
| 6,115,545 | A | 9/2000 | Mellquist |
| 6,172,986 | B1 | 1/2001 | Watanuki et al. |
| 6,219,790 | B1 | 4/2001 | Lloyd et al. |
| 6,233,616 | B1 | 5/2001 | Reid |
| 6,311,218 | B1 | 10/2001 | Jain et al. |
| 6,317,838 | B1 | 11/2001 | Baize |
| 6,330,562 | B1 * | 12/2001 | Boden et al. .................. 707/10 |
| 6,360,276 | B1 | 3/2002 | Scott |
| 6,405,253 | B1 * | 6/2002 | Schutte et al. .............. 709/228 |
| 6,529,517 | B2 * | 3/2003 | Hrastar et al. ............... 370/401 |
| 6,553,568 | B1 | 4/2003 | Fijolek et al. |
| 6,601,093 | B1 | 7/2003 | Peters |
| 6,621,297 | B2 | 9/2003 | Watanabe |
| 6,667,971 | B1 | 12/2003 | Modarressi et al. |
| 6,697,864 | B1 | 2/2004 | Demirtjis et al. |
| 6,721,297 | B2 | 4/2004 | Korus et al. |
| 6,775,276 | B1 | 8/2004 | Beser |
| 6,782,422 | B1 | 8/2004 | Bahl et al. |
| 6,804,720 | B1 | 10/2004 | Vilander et al. |
| 6,879,574 | B2 | 4/2005 | Naghian et al. |
| 6,894,994 | B1 | 5/2005 | Grob et al. |
| 6,912,205 | B2 | 6/2005 | Perlman et al. |
| 6,915,345 | B1 | 7/2005 | Tummala et al. |
| 6,947,400 | B2 | 9/2005 | Heller |
| 6,954,790 | B2 | 10/2005 | Forslow |
| 6,959,009 | B2 | 10/2005 | Asokan et al. |
| 6,973,076 | B2 | 12/2005 | Takeda et al. |
| 6,973,086 | B2 | 12/2005 | Patil et al. |
| 7,002,924 | B2 | 2/2006 | Braun et al. |
| 7,069,344 | B2 | 6/2006 | Carolan et al. |
| 7,139,828 | B2 | 11/2006 | Alkhatib et al. |
| 7,143,435 | B1 | 11/2006 | Droms et al. |
| 7,154,891 | B1 | 12/2006 | Callon |
| 7,171,198 | B2 | 1/2007 | Paila et al. |
| 7,171,475 | B2 | 1/2007 | Weisman et al. |
| 7,266,090 | B2 | 9/2007 | Sawada et al. |
| 7,269,166 | B2 | 9/2007 | Koskiahde et al. |
| 7,286,671 | B2 | 10/2007 | Yegin et al. |
| 7,328,014 | B2 | 2/2008 | Takeda et al. |
| 7,385,981 | B2 | 6/2008 | Choi et al. |
| 2001/0017856 | A1 | 8/2001 | Asokan |
| 2001/0048686 | A1 | 12/2001 | Takeda et al. |
| 2001/0049729 | A1 | 12/2001 | Carolan et al. |
| 2002/0003780 | A1 | 1/2002 | Braun et al. |
| 2002/0006133 | A1 | 1/2002 | Kakemizu et al. |
| 2002/0016858 | A1 | 2/2002 | Sawada et al. |
| 2002/0026573 | A1 | 2/2002 | Park |
| 2002/0059614 | A1 | 5/2002 | Lipsanen et al. |
| 2002/0112058 | A1 | 8/2002 | Weisman et al. |
| 2002/0161867 | A1 | 10/2002 | Cochran et al. |
| 2002/0161905 | A1 | 10/2002 | Haverinen et al. |
| 2002/0191572 | A1 | 12/2002 | Weinstein et al. |
| 2002/0199104 | A1 | 12/2002 | Kakemizu et al. |
| 2003/0028650 | A1 * | 2/2003 | Chen et al. .................. 709/229 |
| 2003/0028763 | A1 | 2/2003 | Malinen et al. |
| 2003/0035409 | A1 | 2/2003 | Wang et al. |
| 2003/0055962 | A1 | 3/2003 | Freund et al. |
| 2003/0081578 | A1 | 5/2003 | White et al. |
| 2003/0093562 | A1 * | 5/2003 | Padala ........................ 709/245 |
| 2003/0131264 | A1 * | 7/2003 | Huff et al. .................... 713/202 |
| 2003/0171112 | A1 | 9/2003 | Lupper et al. |
| 2003/0182548 | A1 | 9/2003 | Xiong et al. |
| 2003/0198219 | A1 * | 10/2003 | Coggeshall .................. 370/389 |
| 2003/0212774 | A1 | 11/2003 | Lee et al. |
| 2003/0235175 | A1 | 12/2003 | Naghian et al. |
| 2004/0052216 | A1 | 3/2004 | Roh |
| 2004/0072557 | A1 | 4/2004 | Paila et al. |
| 2004/0137888 | A1 | 7/2004 | Ohki |
| 2004/0179539 | A1 | 9/2004 | Takeda et al. |
| 2004/0240411 | A1 | 12/2004 | Suzuki |
| 2004/0246939 | A1 | 12/2004 | Kskiahde et al. |
| 2005/0108432 | A1 | 5/2005 | Tominaga et al. |
| 2005/0271034 | A1 | 12/2005 | Asokan et al. |
| 2009/0296731 | A1 * | 12/2009 | Lida et al. ................... 370/449 |
| 2010/0188567 | A1 * | 7/2010 | Ichimura et al. ............ 348/441 |

FOREIGN PATENT DOCUMENTS

| | | |
|---|---|---|
| EP | 1876754 | 1/2008 |
| WO | WO03034687 | 4/2003 |
| WO | WO 2005022893 | 3/2005 |

OTHER PUBLICATIONS

Park et al., "Interworking between GPRS and ISP for Wireless Internet Service of Mobile ISP Subscriber," 2006, IEEE, pp. 1-4.

Jia et al., "Architecture of Secure Cross-Platform and Network Communications," 2006, ACM, pp. 321-218.

Brik et al., "Debugging DHCP Performance," 2004, ACM, pp. 257-262.

Droms et al., "Network Working Group Request for Comments: 3118," Jun. 2001, University of Maryland, pp. 1-17.

Droms, R., "Dynamic Host Configuration Protocol", Mar. 1997, pp. 1-45.

Alexander, S. et al., "DHCP Options and BOOTP Vendor Extensions", Mar. 1997, pp. 1-34.

* cited by examiner

METHOD AND APPARATUS FOR ASSIGNING NETWORK ADDRESSES BASED ON CONNECTION AUTHENTICATION

CROSS-REFERENCE TO RELATED APPLICATION

This application is a continuation of U.S. patent application Ser. No. 09/981,182 filed Oct. 16, 2001 now U.S. Pat. 7,502,929 which is incorporated herein by reference as if fully set forth herein, under 35 U.S.C. §120.

FIELD OF THE INVENTION

The present invention generally relates to dynamically assigning network addresses. The invention relates more specifically to assigning network addresses based on connection authentication.

BACKGROUND

A computer network typically includes computer processors or "hosts" that host software applications that provide or request services, or both. The hosts may be network terminals or end stations that do not perform network traffic routing or forwarding functions. The hosts communicate with each other through network devices, also called intermediate devices, such as switches and routers, which do perform routing and forwarding functions. Some intermediate devices are themselves hosts for some routing or forwarding applications and services. Internet Protocol (IP) is often used for sending packets of information between processes running on hosts on a network. As used hereinafter, a server refers to a server process that provides a service and a client refers to a client process that requests a service, unless otherwise indicated to refer to the host or device on which the process executes. According to the Internet Protocol (IP), different hosts have different logical addresses, called IP addresses, which are used by the intermediate devices to route and forward data packets from one host to another.

A local area network (LAN) connects hosts in a relatively small geographic area for sharing resources. Resources shared on the LAN often include data files, devices such as printers, and applications such as word processors. LAN protocols function at the level of the physical connection between devices on the LAN, and the data link between the connection and the operating system on a device. In contrast, IP functions at the level where client and server processes send or receive data directed to each other. Intermediate devices that forward packets on the basis of their built-in, media access control (MAC) addresses are called switches. Intermediate devices that forward packets on the basis of administratively assigned, topologically relevant, IP addresses are called routers.

Many LAN protocols give access to all resources on the LAN to every host physically connected to the LAN. In many circumstances, LAN administrators desire to control access to resources on the LAN by limiting physical connection to the LAN to certain authorized hosts.

An emerging LAN protocol for controlling access to LAN resources is defined by the Institute of Electrical and Electronics Engineers (IEEE) standard 802.1x. IEEE 802.1x provides LAN access control based on physical ports. In this context, a physical port is a single point physical connection, such as a single interface card, to an intermediate device on the LAN. A physical port may include a wireless interface that receives electromagnetic signals. Many intermediate devices, such as switches and routers, each have multiple interface cards. A physical port is an element of one of the interface cards on such an intermediate device. IEEE 802.1x provides a mechanism for authenticating and authorizing hosts attached to a LAN physical port, and of preventing access through that physical port in cases where the authentication and authorization process fail. The standard provides user-to-network authentication.

According to IEEE 802.1x, information is sent from a supplicant process, hereinafter called the supplicant, on the newly connected host to the intermediate device at the physical port. The information sent by the supplicant might be stored persistently on the host being connected; or the information might be received from a human user of the host, such as in response to prompts for user name and password; or some combination of stored and user-supplied information may be used. The intermediate device runs an authenticator process, hereinafter called the authenticator. The authenticator sends a request to an authorization, authentication and accounting ("AAA") system based on the information from the supplicant. An example of an AAA system is a RADIUS server. The AAA system returns a response indicating whether the connection should succeed or fail. If the response indicates the connection fails, the intermediate device does not forward data communicated to the physical port from the host. If the response indicates the connection succeeds, the intermediate device does forward data communicated to the physical port from the host.

In addition to obtaining access to the network through the physical port, the host also must be configured for network operations. For example, a newly added host is assigned a logical network address for itself, and a network address for the intermediate device that routes or forwards its traffic, among other configuration information. Configuring a host is a tedious process to perform manually. The Dynamic Host Configuration Protocol (DHCP) provides a mechanism through which computers using IP can obtain network addresses and other configuration information automatically. The DHCP process is initiated after the physical connection is authorized using IEEE 802.1x.

After obtaining access through the physical port and being configured, a client on the user's host may request services from servers on the network using IP. In many circumstances, user authentication is also useful in IP communications. For example, based on the user of a client process, it is sometimes desirable to determine accounting information for billing purposes, to provide a minimum quality of service (QoS) according to a contract with the user, or to limit access by the user to certain servers, or to perform some combination of these functions. Many systems track such functions based on the IP address of the client. Intermediate devices serving as conventional gateways to the Internet, for example, control access to the Internet based on an access control list made up of one or more IP addresses. To utilize such systems, a user-to-IP-address authentication process is needed.

There is currently no connection between the user-to-LAN authentication process and the configuration processes, such as DHCP servers, that provide IP addresses.

One approach is to require the user to provide information for the authentication and authorization system to the configuration process that provides the IP address for the host. This approach would also modify the configuration process to send a request to the authorization and authentication system, such as the RADIUS server, based on the information from the user. Based on the response from the authorization and authentication system, the configuration process would assign an IP address associated with the privileges to be afforded to the user, such as accounting, QoS and access to LAN resources.

There are disadvantages to this approach. One disadvantage is that the user is twice subjected to entering the same identification and password information in response to prompts—once for the IEEE 802.1x process and again for the configuration process. This doubles the burden on the user, doubles the chances of a entry mistake that causes the connection to fail, decreases the quality of the user experience, and hinders the perceived utility of the network.

Another disadvantage is that a configuration process on the user's host, such as a DHCP client process, would have to be modified to prompt for the needed information. However, this approach is not practical because tens of millions of DHCP clients have already been deployed over the last decade without such a modification. It would be expensive and take many years to even replace a significant fraction of the deployed DHCP clients.

Based on the foregoing, there is a clear need for techniques that assign network addresses based on a connection authentication process.

In particular, there is a need for a DHCP server that assigns IP addresses based on results from processes following the IEEE 802.x standard, without requiring changes to a DHCP client.

SUMMARY OF THE INVENTION

The foregoing needs, and other needs and objects that will become apparent from the following description, are achieved in the present invention, which comprises, in one aspect, a method for assigning a network address to a host based on authentication of a physical connection between the host and a switch. The method includes receiving first data at the switch from an authentication and authorization server in response to a request for authentication for the physical connection. The first data indicates at least some of authentication and authorization information. A configuration discovery message from the host is also received at the switch. The configuration discovery message is for discovering a logical network address for the host among other configuration information. A second message is generated based on the configuration discovery message and the first data. The second message is sent to a configuration server that provides the logical network address for the host.

The configuration server is then able to provide the logical network address based on the authentication and authorization information. The logical network address is thus based on the user, as is desirable to determine accounting information for billing purposes, to provide a minimum quality of service (QoS) according to a contract with the user, or to limit access by the user to the Internet and other services.

In another aspect of the invention, the method includes receiving from the host a first request for access to a network connected to the switch. The first request includes information about a user of the host. A second request for authentication of the physical connection is sent to an authentication and authorization server. The second request is based on the first request. First data is received at the switch from the authentication and authorization server in response to the second request. The first data indicates at least some of authentication and authorization information. The physical connection is enabled so that it forwards subsequent messages between the host and the network. The first data is stored at least until a discovery message is received from the host for discovering a logical network address for the host.

In another aspect of the invention, the method includes receiving a discovery message at the switch from the host. The discovery message is formed for discovering a configuration server that can provide an IP address. First data is retrieved from a store at the switch. The first data indicates at least some of authentication and authorization information received from an authentication and authorization server in response to a request for authentication of the physical connection. A second message is generated based on the first message and the first data. The second message is sent to a configuration server that provides the logical network address for the host among other configuration information.

In another aspect of the invention, the method includes receiving a configuration discovery message from the switch at a configuration server. The configuration discovery message is for discovering a logical network address for the host among other configuration information. The configuration discovery message includes first data indicating at least some of authentication and authorization information generated in response to a request for authentication for the physical connection. Based on the first data, a particular pool of one or more logical network addresses is selected, from among several pools of one or more logical network addresses. A configuration response message is sent to the host. The configuration response message includes second data indicating a particular network address from the particular pool.

According to another aspect of the invention, the method includes receiving at a configuration server, from the switch, a configuration discovery message for discovering a logical network address for the host. Also received at the configuration server is first data from an authentication and authorization server in response to a request from the switch for authentication for the physical connection. The first data indicating at least some of authentication and authorization information. Based on the first data, a particular pool of one or more logical network addresses is selected, from among several pools of one or more logical network addresses. A configuration response message is sent to the host. The configuration response message includes second data indicating a particular network address from the particular pool.

According to another aspect of the invention, the method includes receiving at an authorization server on a network connected to the switch, a request from the switch. The request is for authenticating the host and includes information provided from the host. It is determined whether the host is authentic and authorized to connect to the network based on the request and based on user profile data in persistent store at the authorization server. A response is sent to the switch. The response indicates whether the host is authentic and authorized. If it is determined that the host is authentic and authorized, then first data is sent to a configuration server. The first data is based on the user profile data. The configuration server provides a logical network address for the host.

According to another aspect of the invention, the method includes receiving at an authorization server on a network connected to the switch, a request from the switch. The request is for authenticating the host and includes information provided from the host for a particular user of the host. Based on user-profile data in persistent store and the information provided from the host, it is determined whether the particular user is authentic and authorized to connect to the network. If it is determined that the particular user is authentic and authorized, then a response is sent to the switch. The response indicates the host is authentic and authorized. The response also includes data indicating a particular group of one or more users authorized for a particular set of network operations. The group includes the particular user. Each network operation in the particular set is controlled by a logical network address of a host of a user involved in the operation.

In other aspects, the invention encompasses an apparatus, a computer apparatus, and a computer-readable medium, including a carrier wave, configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
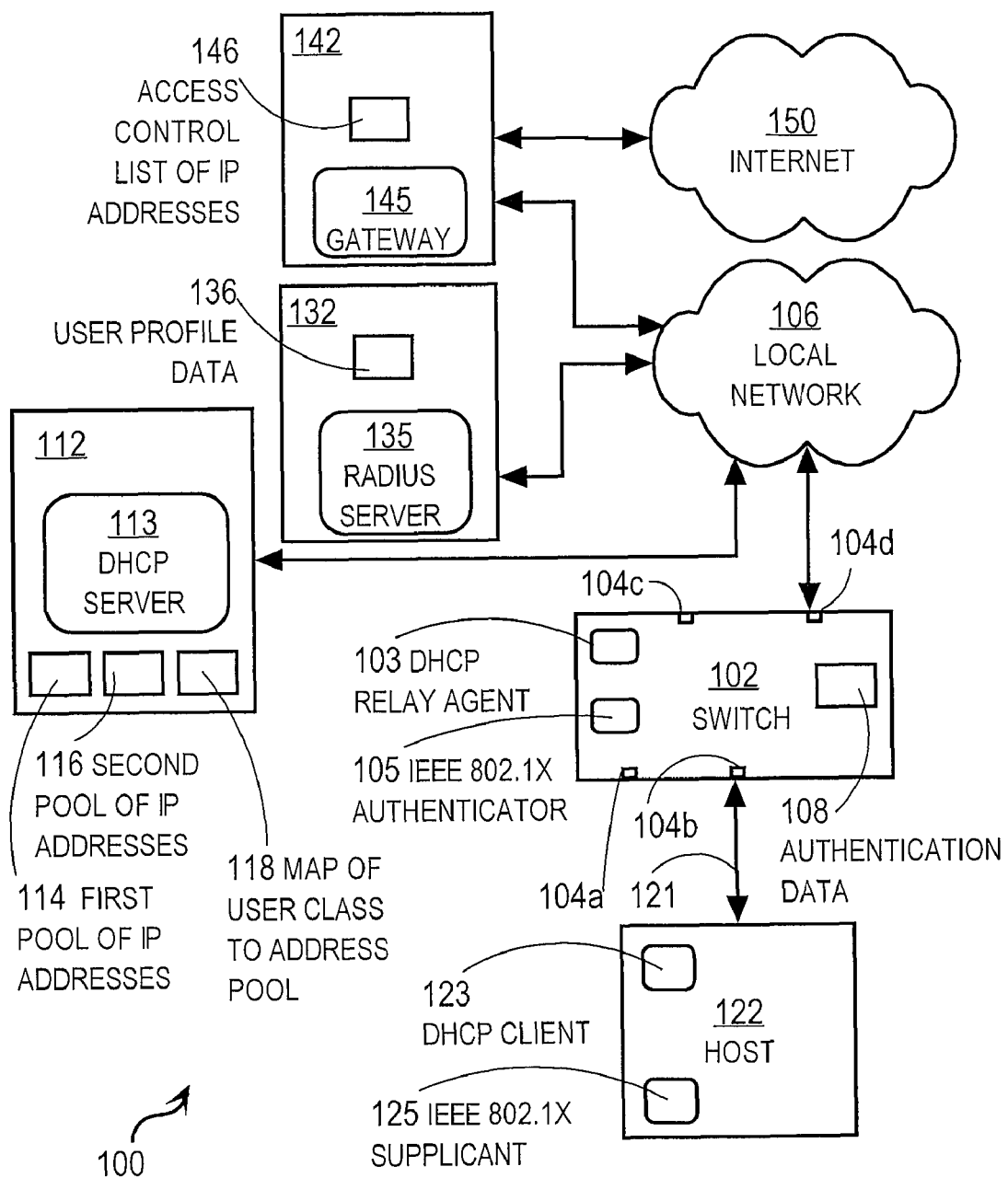
FIG. 1 is a block diagram that illustrates an overview of a system for authorizing a physical connection and assigning logical network addresses.

A method and apparatus for assigning network addresses based on connection authentication is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 OPERATIONAL CONTEXT
   1.1 IEEE 802.1x
   1.2 DHCP
2.0 STRUCTURAL OVERVIEW
3.0 FUNCTIONAL OVERVIEW
4.0 SWITCH PROCESSES
   4.1 AUTHENTICATOR
   4.2 DHCP RELAY AGENT
5.0 DHCP SERVER PROCESS
6.0 RADIUS SERVER PROCESS
7.0 HARDWARE OVERVIEW
8.0 EXTENSIONS AND ALTERNATIVES 1.0 Operational Context Embodiments of the invention may be used with a protocol for controlling access to LAN resources based on a physical port, and with a configuration server that provides network addresses, and with an authentication and authorization server. For purposes of illustrating a specific example the authentication of a physical connection and the assignment of network addresses, embodiments are described herein in the context of the IEEE 802.1x standard and the Dynamic Host Configuration Protocol (DHCP) and the RADIUS server as an authentication, authorization and accounting (AAA) server. However, this specific context is not required, and other standards, protocols and servers may be substituted. Examples are given below as described with respect to FIG. 1 and section 2.0, Structural Overview.

1.1 IEEE 802.1x

The Background section of this document describes an emerging standard for controlling access to LAN resources based on a physical port, known as the IEEE 802.1x standard. IEEE 802.1x applies to Ethernet ports including wireless Ethernet ports. A wireless Ethernet port is herein considered a physical port. Hardware separates the wireless Ethernet ports based on a particular time slot and encryption key combination.

1.2 DHCP

The Dynamic Host Configuration Protocol (DHCP) is an open standard protocol for dynamic host configuration described in RFC 2131 and RFC 2132, which are available at the time of this writing as documents rfc2131.html and rfc2132.html, respectively, on the World Wide Web (www) at domain and directory ietf.org/rfc. A DHCP server process operates on a DHCP server host that is conveniently located for several hosts on one or more local networks. One or more DHCP server hosts and processes are set up by a system administrator with information to configure the hosts on one or more local networks to reflect the current architecture of those local networks. A DHCP client process operates on each host of the local networks.

When a host begins operations on the local network, the DHCP client on that host requests configuration information from one of the DHCP servers. In response to the request from the DHCP client, one or more of the DHCP servers respond with configuration information to be used by the host of the DHCP client for a pre-determined period of time ("lease time"), including an IP address for the host of the DHCP client. Such responses take the form of "offers" of leases of addresses. The DHCP client notifies the servers that one of the offers is accepted. The host that is executing the DHCP client then uses the configuration information including the address. The configuration information is bound to the particular DHCP client, and the DHCP server that offered the lease records the binding.

A DHCP relay agent is a process that executes on an intermediate device to forward DHCP messages between DHCP client and DHCP server. The DHCP relay agent facilitates communications with the DHCP client before the DHCP client's host is bound to a particular IP address. The DHCP relay agent is used when the DHCP client cannot broadcast directly to the DHCP server because it is separated from that DHCP server by network intermediate devices such as routers. In this case, the DHCP relay agent on the intermediate device closest to the DHCP client receives a broadcast to a well known logical port, port 67, and then forwards the DHCP client's packet on to all DHCP servers for which the relay agent is configured. In this way, the DHCP client can broadcast locally and still make contact with one or more DHCP servers separated by one or more intermediate devices.

2.0 Structural Overview

FIG. 1 is a block diagram that illustrates an overview of a system for authorizing a physical connection and assigning logical network addresses.

In the example of FIG. 1, system 100 includes a switch 102 that is communicatively coupled to a local network 106. A host 122 connects to the local network 106 through switch 102. The system 100 also includes a RADIUS server host 132, a DHCP server host 112 and a gateway host 142. The gateway host 142 is connected to Internet 150, or to any other public network or internetwork.

The switch 102 includes physical ports 104a, 104b, 104c, 104d, collectively referenced as physical ports 104. The switch 102 employs the IEEE 802.1x standard for physical-port-based access control. An authenticator 105 executes on a processor of the switch 102 to apply the IEEE 802.1x standard. Authenticator 105 stores authentication and authorization data in a persistent store 108 on the switch 102, as described in more detail below. The authentication and authorization data contains information obtained from the RADIUS server host 132. IEEE 802.1x does not require or suggest storage of the authentication and authorization data from a RADIUS server host 132 at the switch 102, as described in more detail below.

In addition, in the example of FIG. 1, a DHCP relay agent 103 also executes on the processor of switch 102. DHCP relay agent 103 communicates using DHCP messages with the DHCP client 123 on host 122 and a DHCP server on the DHCP server host 112. DHCP relay agent 103 uses the authentication and authorization data in the persistent store 108 on the switch, as described in more detail below. DHCP does not require or suggest using the authentication and authorization data from a RADIUS server host by a DHCP relay agent 103.

The host 122 employs the IEEE 802.1x standard for physical-port-based access control and DHCP for network configuration including IP address assignment. The host is connected to physical port 104b of switch 102 through connection 121. The connection 121 may be by cable or by a wireless signal, such as an electromagnetic or acoustic signal. A supplicant 125 executes on a processor of the host 122 to apply the IEEE 802.1x standard. The supplicant obtains information from a user of the host, such as the user identification and password, and sends that information to the authenticator 105 through physical port 104b using connection 121. A DHCP client 123 executes on the processor of the host 122 to obtain an IP address, among other configuration information, from a DHCP server.

The RADIUS server host 132 includes a processor that executes a RADIUS server 135. The RADIUS server provides authentication, authorization and accounting (AAA) services. Authentication services determine that a user is who the user claims to be, such as by verifying a password and user identification combination. Authorization services indicate that the authenticated user has certain privileges to perform operations on the network. For example, an authorization service determines that an authenticated user is allowed to establish a physical connection to the local network but is not allowed to access the Internet. Accounting services determine that the user's use of authorized operations is tracked, for example to support QoS agreements and to enforce usage limits. The RADIUS server maintains one or more data structures of user profile data 136 that includes the user identification, password, and privileges. The RADIUS server 135 receives a request from the authenticator 105 to authenticate the user of host 122. The RADIUS server sends a response indicating whether authentication succeeds or fails. In some embodiments, when the authentication succeeds, the RADIUS server also sends authorization information.

According to one embodiment, a user class is associated with each user in the user profile data 136. Multiple users of the local network who have substantially the same authorizations for LAN resources and accounts, as enforced by one or more services on the LAN based on the users' IP addresses, are placed in the same user class. In this embodiment, the user class is included in authorization information sent by the RADIUS server to the authenticator 105.

The DHCP server host 112 includes a processor on which executes a process called the DHCP server 113. The DHCP server 113 applies DHCP for exchanging messages with DHCP clients and DHCP relay agents in order to provide IP addresses and other configuration information to hosts that become connected to the local network 106.

According to the illustrated embodiment, the DHCP server 113 assigns IP addresses from several pools of IP addresses, including a first pool 114 of IP addresses and a second pool 116 of IP addresses, that are stored on the DHCP server host 112 in one or more data structures. In addition, the DHCP server stores a data structure herein called a map 118 that associates each pool of IP addresses with a user class. DHCP does not require that the DHCP server 113 store and use a map 118 associating a user class with a pool of IP addresses. In addition, the DHCP server 113 obtains the user class, for a user of a host being configured, from the DHCP relay agent 103. The user class is based on information among the authentication and authorization data in the persistent store 108 on the switch 102. DHCP does not require or suggest that the DHCP server 113 obtain a user class from a DHCP relay agent.

The gateway host 142 includes a processor on which executes a process called a gateway 145. The gateway 145 determines whether a client process on a host connected to the local network may exchange data packets over the Internet 150, based on the IP address of the host where the client is executing. The gateway maintains an access control list 146 of IP addresses in one or more data structures. Only a client operating on a host having an IP address included in the access control list 146 is allowed by the gateway 145 to exchange data packets over the Internet 150.

Although shown in FIG. 1 as executing on separate hosts, in other embodiments, any process of a certain group, which includes the DHCP server, the RADIUS server and the gateway, may execute on the same host as one or more other processes of that certain group.

3.0 Functional Overview

Figure 2:
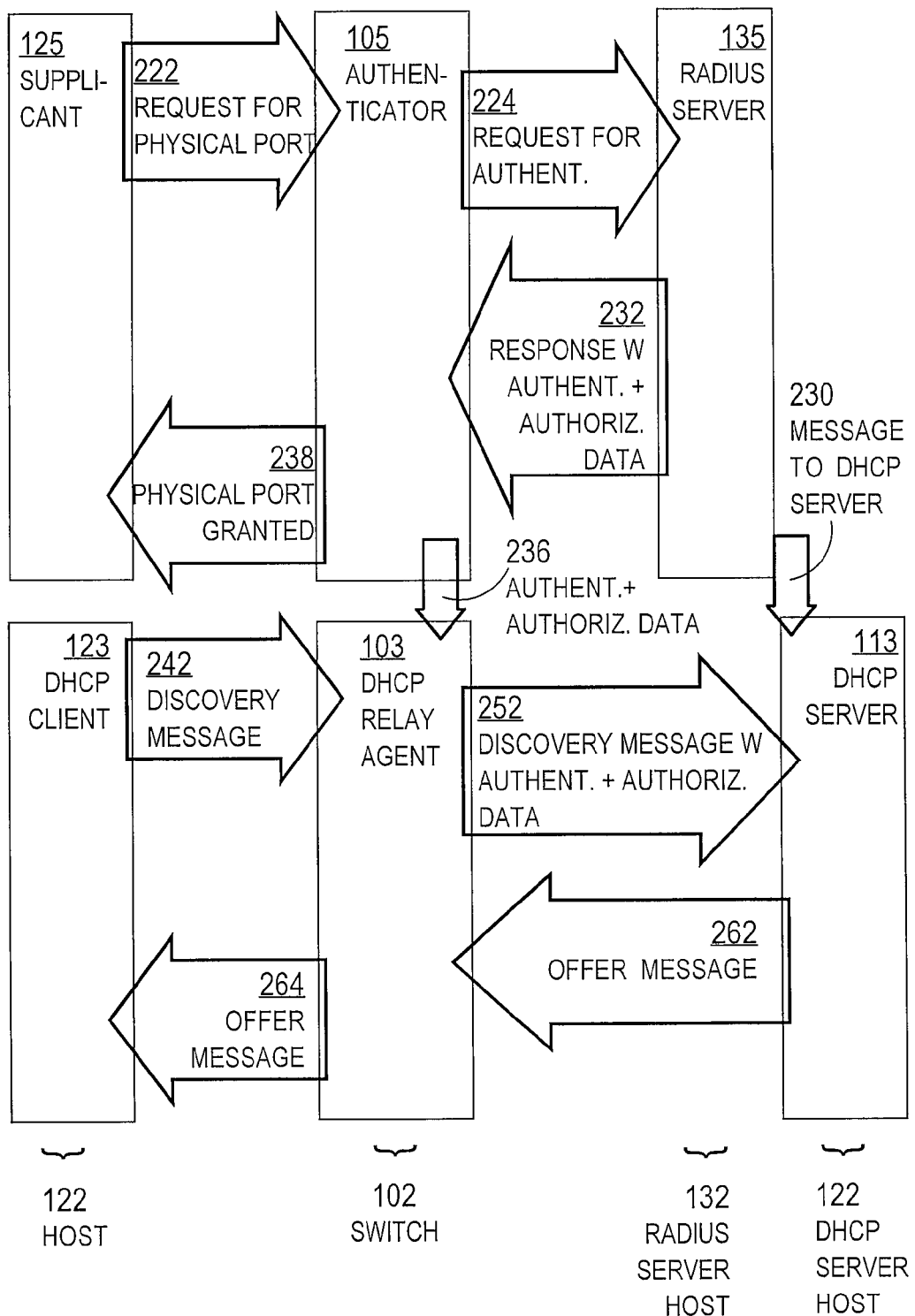
FIG. 2 is a time line chart that illustrates an sequence of messages sent between some components of the system of FIG. 1.

FIG. 2 is a time line chart that illustrates a sequence of messages sent between some components of the system of FIG. 1. In FIG. 2, time increases from top to bottom. Blocks in the first column represent processes that execute on the host 122. Blocks in the second column represent processes that execute on the switch 102. Arrows indicate messages that are sent at a relative time given by the point of the arrow.

At time t1, supplicant 125 sends a request 222 for access at a physical port, e.g., at port 104b. The request is sent whenever the host is powered up or otherwise reconnected to the switch. The request includes information from a user of the host, such as user identification and a password, according to IEEE 802.1x. Different persons might use a single host at different times. The user at the time the host becomes connected is typically responsible for disconnecting before a second user employs the same host. The authenticator 105 receives the request.

At time t2, after t1, the authenticator 105 sends a request 224 to the RADIUS server 135 according to IEEE 802.1x. The request 224 includes at least some of the information about the host and user received in the request 222. The RADIUS server then determines whether the user is authentic based on the user information and, if so, whether the authentic user is authorized to connect to the local network. If the user is not authentic or not authorized to connect, a response is sent indicating that authentication fails, according to IEEE 802.1x. In response to a failed authentication, the authenticator causes the switch to block network traffic with the host through the physical port 104b.

If the user is authentic, and the authentic user is authorized to connect to the local network, then a response 232 is prepared that includes authentication data indicating that authentication succeeds and authorization data indicating any services the user is privileged to request. According to some embodiments, the authentication data includes credentials that identify the user and that assure a trusted RADIUS server is the source of the authentication and authorization. In the illustrated embodiment, the authorization data also indicates the user class associated in the user profile data 136 with an authentic user.

At time t3 after t2, the response 232, including the authentication and authorization data, is sent to the authenticator 105 on switch 102.

In a first set of embodiments, a message 230 is sent to the DHCP server with at least some of the authentication and authorization data, as described below with respect to FIG. 5 and FIG. 6. For example, a message 230 is sent with the user class and a media access control (MAC) identification number that uniquely identifies the host that is being operated by the user. The DHCP server is modified to accept message 230. For example, in one embodiment the message is a DHCP message, such as a DHCPREQUEST message or a DHCPINFORM message, with options defined that indicate the message contains authentication and authorization information. In another embodiment, the message is not a DHCP message but is simply a data packet having a destination IP address of the DHCP server and a destination logical port of well-known port 67. In a second set of embodiments, the message 230 is not generated or sent by the RADIUS server.

When the response 232 is received at time t3 by the authenticator 105 on switch 102, the authenticator enables the physical port on which the request 222 was received at time t1. For example, the authenticator 105 enables physical port 104b to exchange data packets with the host 122. The authenticator generates an acknowledgment message 238, according to IEEE 802.1x, and sends the message 238 at time t4 after time t3.

According to the second set of embodiments, message 230 is not generated or sent by the RADIUS server; but, instead, at least some authentication and authorization data 236 are passed to the DHCP relay agent 103 from the authenticator 105. In an illustrated embodiment, the passed authentication and authorization data 236 are stored in a persistent store 108 on the switch 102. The DHCP relay agent 103, which also executes on the switch 102, also has access to the persistent store 108. In other embodiments, other means are used to pass authentication and authorization data 236 to the DHCP relay agent. For example a message containing authentication and authorization data 236 is sent from the authenticator 105 to the DHCP relay agent 103.

At time t5 after t4, the DHCP client on the host 122 broadcasts a DHCP discovery message to request configuration information that includes an IP address for the host 122. A conventional switch without a DHCP relay agent would receive and then also broadcast the same DHCP discovery message. Also, the first embodiments do not require a DHCP relay agent 103 be included on the switch 102. However, according to the second set of embodiments, the switch includes the DHCP relay agent 103.

A DHCP relay agent directs an IP data packet containing the DHCP discovery message to one or more DHCP servers using the IP address of each DHCP server host in the destination address of the data packet, and using the well-known port 67 in the destination logical port. In the illustrated embodiment, the DHCP relay agent 103 generates a UDP/IP data packet with the IP address of the DHCP server host 112 in the destination address and the well-known logical port 67 in the destination logical port.

Figure 3:
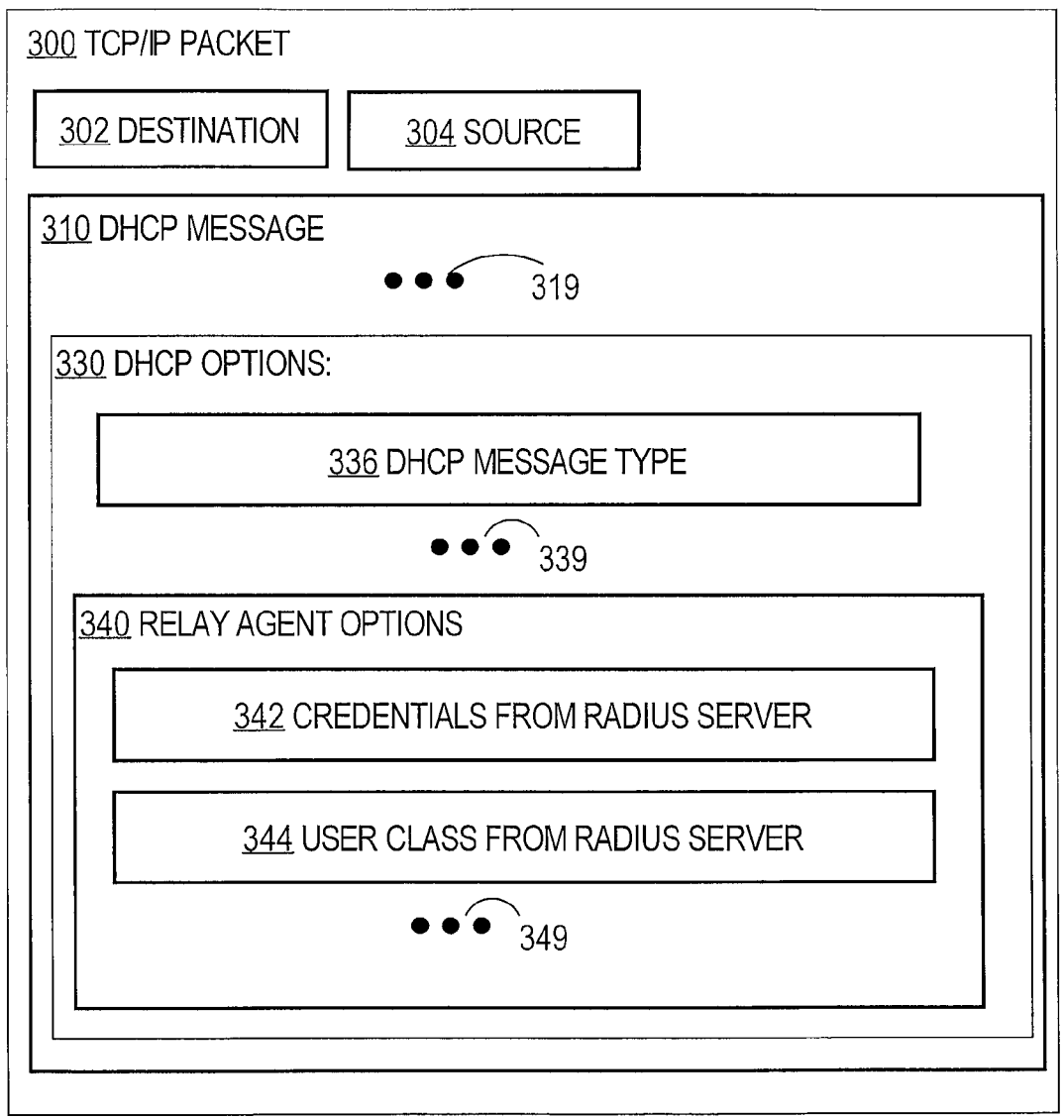
FIG. 3 is a block diagram that illustrates an DHCP discovery message.

Further, before sending the data packet to the DHCP server 113, the DHCP relay agent 103 includes authentication and authorization information in the DHCP discovery message. To illustrate one way in which this is accomplished, consider FIG. 3. FIG. 3 is a block diagram that illustrates a DHCP discovery message 330 in a UDP/IP data packet 300 according to an embodiment.

DHCP messages are included in UDP/IP data packets. UDP/IP packets include a destination field 302 and a source field 304. The destination field holds data indicating the IP address of the intermediate device or host that is to receive the UDP/IP packet. Routers efficiently transmit UDP/IP packets using hardware configured to interpret the destination address in destination field 302. The source field holds data indicating the IP address of the intermediate device or host that sent the UDP/IP packet.

The UDP/IP packet includes payload data that is not used by UDP/IP to transfer packets. The illustrated embodiment includes a DHCP message 310 in the data payload. A DHCP message 310 includes a set of fields used in an earlier protocol for passing IP addresses, and a set of fields in a DHCP options portion 330 of the DHCP message. The fields of the earlier protocol are indicated by the ellipsis 319.

The fields in the DHCP options portion include the DHCP message-type field 336, among others. The DHCP message-type field 336 holds data that indicates the type of message, such as an initial discovery request (a "DHCPDISCOVER" message type) and a renewal request (a "DHCPREQUEST" type), and the response with an offer (an "DHCPOFFER" type), among others. Other fields of the DHCP options portion are indicated by the ellipsis 339.

The DHCP options portion includes a DHCP relay agent options portion 340. According to the second set of embodiments, DHCP relay agent options are added to carry authentication and authorization data. The options are specified according to the DHCP for specifying options in a DHCP message. In one embodiment, the DHCP relay agent option includes a credentials field 342 and a user class field 344. The credentials field 342 includes data that indicates the actual user, and that the trusted RADIUS server is the source of the authentication and authorization data. The user class field 344 includes data indicating the user class for the user of the host 122, as determined by the RADIUS server 135. Other fields of the relay agent options portion are indicated by the ellipsis 349.

At time t6 after t5, the DHCP relay agent 103 sends a DHCP discovery message 252 in a UDP/IP data packet directed to the DHCP server 113. The DHCP discovery message 252 includes authentication and authorization data 236. For example, the DHCP discovery message includes data in the credentials field 342 and in the user class field 344.

According to the illustrated embodiment, the DHCP server 113 selects a pool of IP addresses based on the authentication and authorization data 236 in the DHCP discovery message 252. For example, the DHCP server 113 determines a particular user class from the data in the user class field 344. The DHCP server 113 finds the particular user class in the map 118 associating user classes with corresponding pools, and determines that the corresponding pool is the second pool. The DHCP server 113 therefore selects the second pool 116 of IP addresses. The DHCP server 113 selects a particular IP address from the selected pool of IP addresses. For example, the DHCP server 113 selects one IP address from the second pool 116 of IP addresses.

If the message 230 is sent from the RADIUS server 135 to the DHCP server 113 instead of sending the data 236 from the authenticator 105 to the DHCP relay agent 103, then the pool is selected based on the data in message 230, as described below in more detail with reference to FIG. 5.

The DHCP server 113 then performs other configuration information generation according to conventional methods or methods known in the art at the time the system is implemented, and generates a DHCP offer message 262.

At time t7 after t6, the DHCP offer message 262 is sent from the DHCP server 113 to the DHCP relay agent 103. At time t8 after t7, the DHCP relay agent 103 sends to the DHCP client 123 on host 122 an offer message 264 based on the offer message 262.

Further DHCP messages, not shown, are sent between DHCP client 123 and DHCP relay agent 103 and DHCP server 113 to bind an offered IP address to the host 122 for a lease period. The further messages are generated and sent according to conventional methods at the time the system is implemented.

After the host 122 is configured with the IP address, a client on the host may attempt to access resources on the Internet. For example, a browser on the host 122 may request a Web page from a Web site on the Internet. The request is a data packet that includes the IP address of the host 122 in the source field 304. Routers on the local network 106 direct the data packet to the gateway 145. The gateway checks the IP address in the source field 304 against the list of IP addresses in the access control list 146. If the IP address is listed in the access control list, the data packet is forwarded to the Internet 150.

For the example in which the user class is associated with the second pool 116 of IP addresses, if the IP addresses in the access control list 146 matches the IP addresses in the first pool 114 of IP addresses but not those in the second pool 116, then requests from host 122 for Web pages on the Internet are denied.

4.0 Switch Processes

Figure 4:
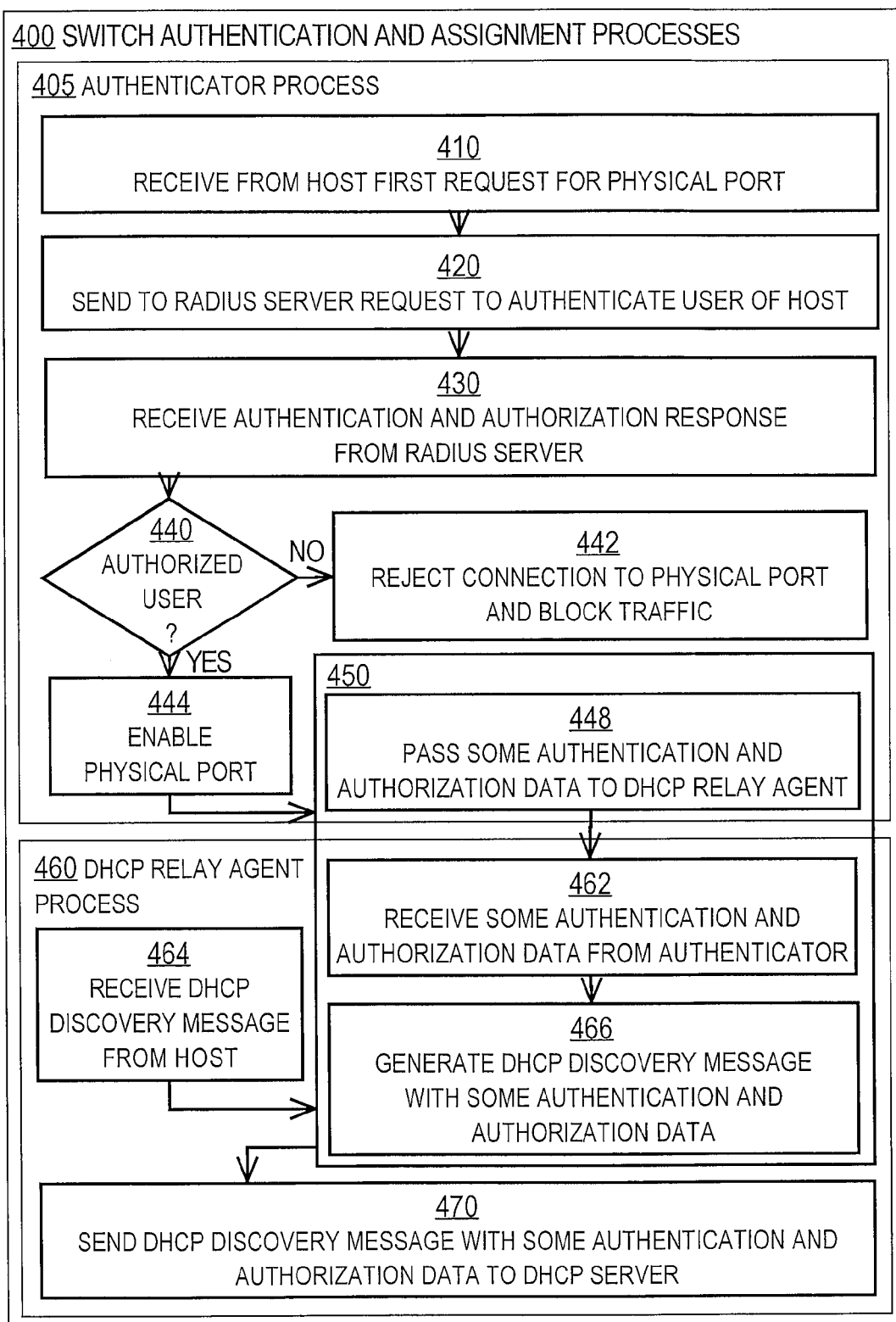
FIG. 4 is a flow diagram that illustrates one embodiment of a method performed at a switch for basing an IP address on connection authentication.

FIG. 4 is a flow diagram that illustrates embodiment of a method performed at a switch for basing an IP address on connection authentication.

Steps in method 400 are divided between an authenticator method 405 and a DHCP relay agent method 460. In other embodiments, the steps of method 400 are performed by a single process or by different processes. Although the steps are illustrated in FIG. 4 and following figures in a particular order, the steps may be reordered or occur at overlapping times in other embodiments.

4.1 Authenticator

In step 410, a request for use of a physical port is received from a newly connected host. For example, request 222 using IEEE 802.1x is received from supplicant 125 on host 122 at authenticator 105 on switch 102. An example request 222 includes a user identification string and a password supplied by a user of the host 122

In step 420, a request to authenticate a user of the host is sent to an authentication and authorization server, such as the RADIUS server. For example, request 224 is sent from the authenticator 105 on switch 102 to the RADIUS server 135 on host 132. The request includes information received from the newly connected host. The request 224 may include the user identification string and a password.

In step 430, a response is received from the authentication and authorization server that indicates whether the user is authentic and is authorized to connect to the network. For example, response 232 is received at the authenticator 105 on switch 102 from authentication and authorization server 135 on host 132. The response also includes information about the user and the authentication and authorization server, at least if the user is authentic and authorized to connect. For example, the response includes a user class if the user is authorized to connect. The user class indicates which operations on the local network involve the user. For example, a particular user class for the user of host 122, included in the response received from the RADIUS server, indicates that the user may not access the Internet.

In step 440, it is determined whether the user is authorized to connect to the network. For example, it is determined whether the response from the authentication and authorization server indicates that the user is both authentic and authorized to connect to the local network. If not, control passes to step 442 to block network traffic through that port and to send a message to the host that network access is rejected. For example, the port is not enabled, and an IEEE 802.1x message that negates acknowledgement (an IEEE 802.1x "NAK" message) is sent to the newly connected host 122.

If it is determined in step 440 that the user is authorized to connect to the network, control passes to step 444. In step 444, the physical port is enabled so that network traffic is passed. According to the IEEE 802.1x standard, an acknowledgement message is sent to the newly connected host 122.

Control then passes to step 450 to generate a configuration request message based on the authentication and authorization information received from the authentication and authorization server in step 430 and on a request from the newly connected host for configuration information.

In embodiments in which the method 400 is divided between a method 405 performed by the authenticator 105 and a method 460 performed by the DHCP relay agent 103, step 450 includes step 448 performed by the authenticator 105, and steps 462 and 466 performed by the DHCP relay agent 103.

In step 448, at least some authentication and authorization data is passed to the DHCP relay agent. This is performed in any manner known in the art at the time the method 400 is implemented. For example, a message directed to the DHCP relay agent can be generated and sent. In the illustrated embodiment, the authentication and authorization data to be passed, including the user class, is stored in persistent store 108 on the switch 102. In either case the DHCP relay agent is also configured to receive the passed information.

4.2 DHCP Relay Agent

In step 464, a message is received from the newly connected host for configuration information. For example, a DHCP discovery message is received, from DHCP client 123 on host 122, at the switch 102 through the port 104b. In embodiments in which the method 400 is divided between a method 405 performed by the authenticator 105 and a method 460 performed by the DHCP relay agent 103, the DHCP discovery message received from DHCP client 123 on host 122 in step 464 is received by the DHCP relay agent 103.

In step 462, the DHCP relay agent 103 receives the authentication and authorization information passed by the authenticator 105. For example, the DHCP relay agent 103 retrieves the authentication and authorization data from the persistent store 108. In the illustrated embodiment, the data retrieved from persistent store 108 includes the particular user class of the user of host 122. In some embodiments, the data is retrieved from the persistent store in response to receiving the DHCP request message from the host in step 464.

In step 466 the DHCP relay agent 103 generates a revised DHCP discovery message that includes at least some of the authentication and authorization information. For example, the DHCP relay agent 103 generates discovery message 252 with data indicating the particular user class placed into the user class field 344. In some embodiments, other authentication and authorization information is placed into the credentials field 342. In step 470, the revised discovery message is sent to the DHCP server 113 on host 112.

In subsequent steps, not shown, the DHCP relay agent 103 forwards other DHCP messages between DHCP client 123 and DHCP server 113 according to any method known in the art at the time the method 400 is implemented. After the host 122 is configured with an IP address, the data in the persistent store may be overwritten, such as when the host reconnects with physical port 104*b*.

5.0 DHCP Server Process

Figure 5:
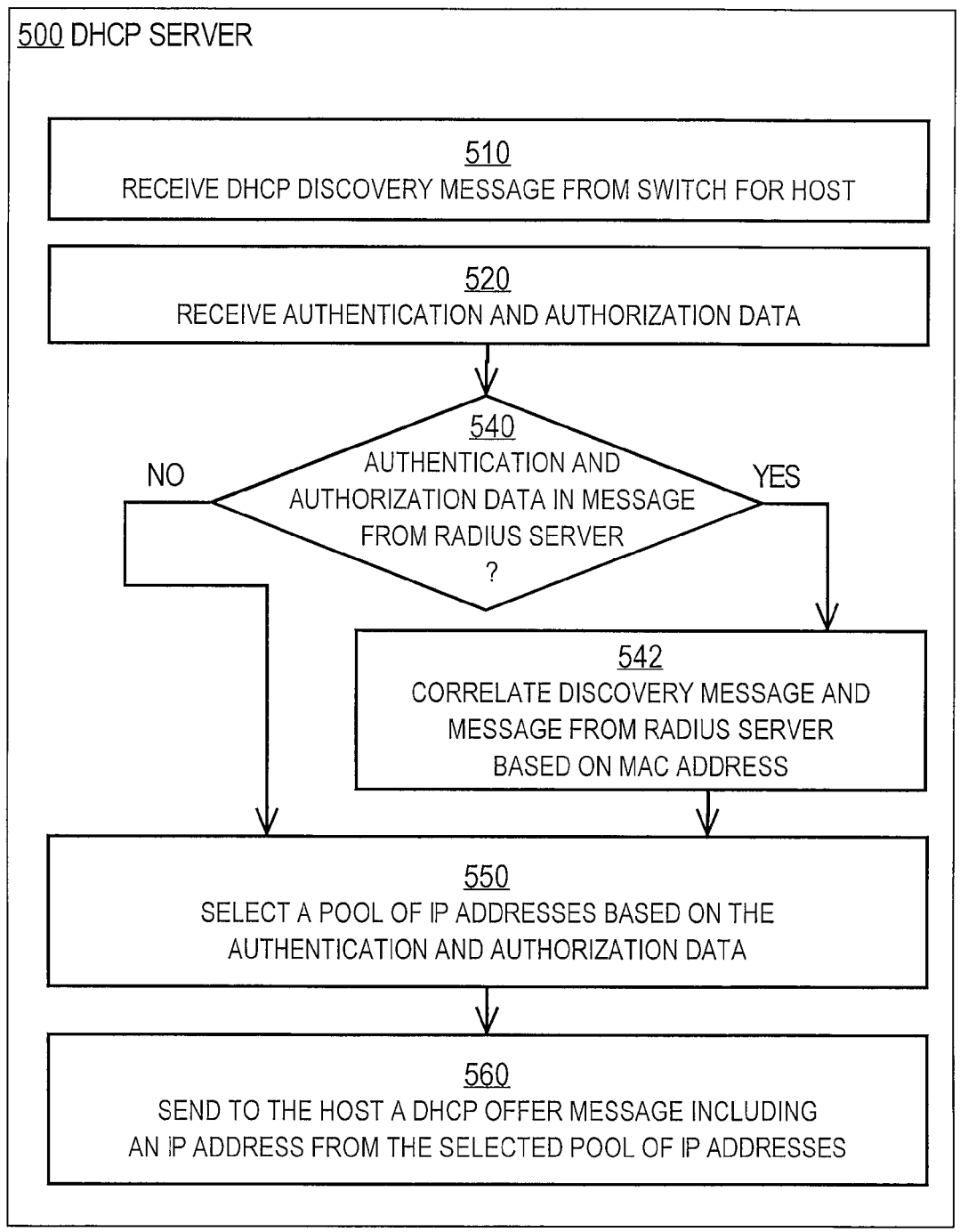
FIG. 5 is a flow diagram that illustrates one embodiment of a method performed at a configuration server for basing an IP address on connection authentication.

FIG. 5 is a flow diagram that illustrates an example of a method performed at a configuration server for basing an IP address on connection authentication. For example, DHCP server 113 performs method 500.

Method 500 applies in the two sets of embodiments. In the first set of embodiments, the DHCP discovery message is rebroadcast from the switch, and AAA data is sent to the configuration server directly from the AAA server. Conventional authenticators and DHCP servers may be used on switch 102 in the first set of embodiments. That is, method 400 illustrated in FIG. 4, is optional in the first set of embodiments. In the second set of embodiments, the DHCP discovery message includes AAA data.

In step 510, a DHCP discovery message for obtaining configuration information for a host is received from the switch. For example the DHCP discovery message 252 is received from the DHCP relay agent 103 on the switch 102.

In step 520, AAA data is received. In the first set of embodiments, the AAA data is received in a separate message from the AAA server. In the second set of embodiments, the AAA data is received in the DHCP discovery message. For example, the DHCP discovery message includes data indicating the particular user class of the user of host 122.

Step 540 represents a decision point that determines whether the AAA data came directly from the AAA server, as in the first set of embodiments. For example, step 540 determines whether the AAA data were not received in the DHCP discovery message but instead were received in message 230 from the RADIUS server. The decision point may be implemented in any manner known in the art. For example, decision point 540 may be implemented as a branch point in a program. Also, the decision point may be made as a design choice to employ only the first set of embodiments, or only the second set of embodiments. In the second set of embodiments, control passes to step 550, described below.

In the first set of embodiments, in which the AAA data is received in a message from the AAA server, such as in message 230 from the RADIUS server, control passes to step 542 to correlate the message from the AAA server with the configuration discovery message from the switch 102. For example, a media access control (MAC) address installed on each host by a manufacturer is included in each message 230 and each DHCP discovery message. A message 230 from the RADIUS server 135 is correlated with a DHCP discovery message from switch 102 if both have the same MAC address and the DHCP discovery message is received within a certain limited time of sending the message 230. The limited time makes likely that the user of the host has not changed since the user information was provided to the RADIUS server. In other embodiments, other methods known in the art at the time the method is implemented to correlate two messages are employed.

Control then passes to step 550 to select a pool of addresses based on the AAA data. For example, the AAA data includes the particular user class of the user of host 122. DHCP server 113 selects the second pool 116 of IP addresses based on the map 118 that associates the second pool with the particular user class. The IP addresses in the second pool are not in the access control list 146 of the gateway process for the Internet. Therefore, users in the particular user class are not granted access to the Internet.

In step 560, an IP address from the selected pool is sent to the host. For example, a DHCP offer message is sent to the host 122 with an IP address from the second pool. In following steps, not shown, the IP address is bound to the host according to any configuration method known in the art at the time method 500 is implemented.

6.0 Radius Server Process

Figure 6:
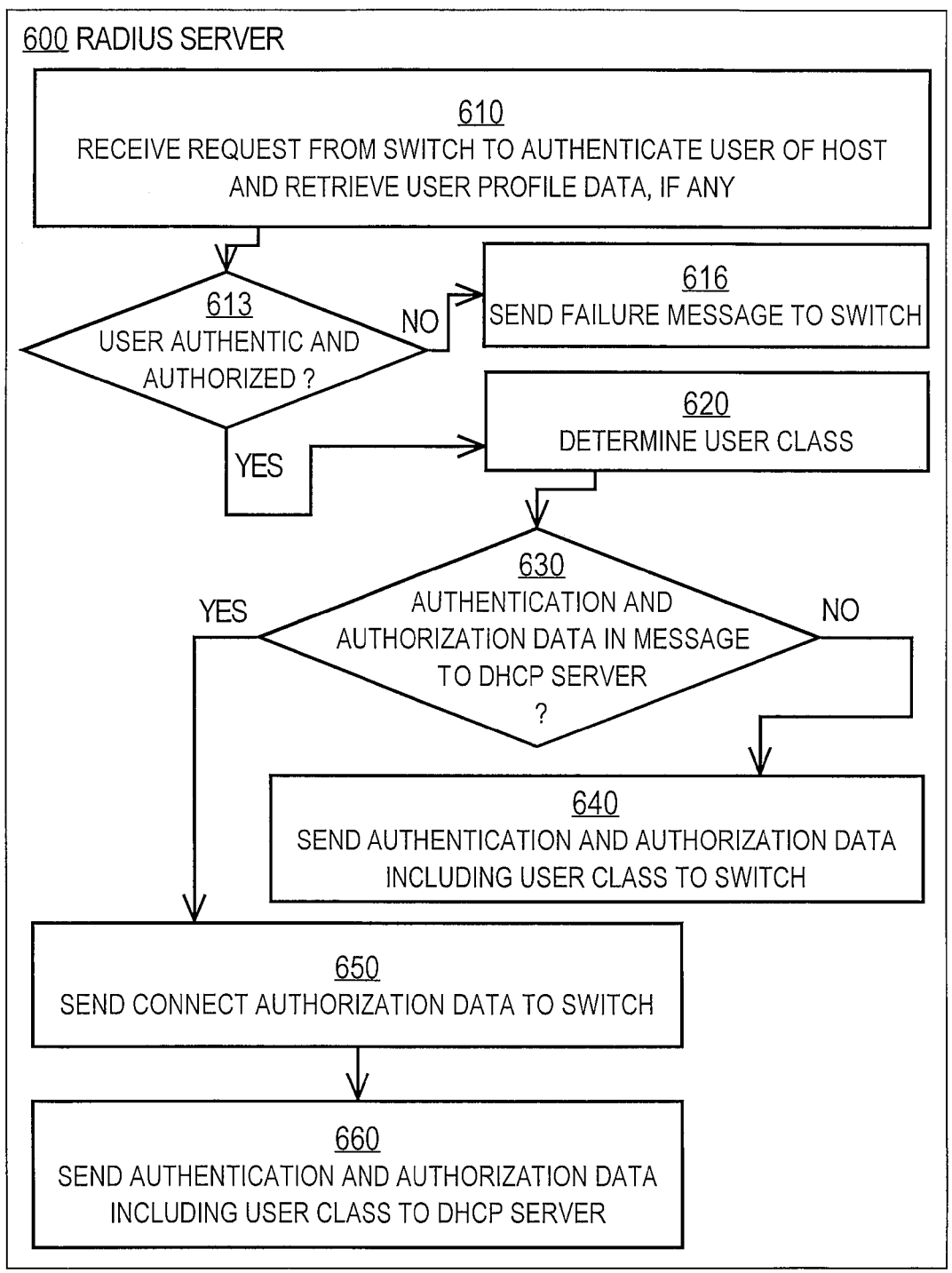
FIG. 6 is a flow diagram that illustrates one embodiments of a method performed at an authentication and authorization server for basing an IP address on connection authentication.

FIG. 6 is a flow diagram that illustrates one embodiment of a method performed at an AAA server for basing an IP address on connection authentication. For example, the RADIUS server 135 performs method 600.

In step 610, a request is received from switch 102 to authenticate a user of the host 122. The request includes information about a user of the host 122. For example, request 224 is received from authenticator 105 on switch 102. Also in step 610, any AAA data associated with the user information is retrieved from the user profile data 136.

In step 613 it is determined whether the user is authentic and authorized to connect to the local network. If not, control passes to step 616 in which a message indicating that connection to the physical port fails is sent to the switch. For example the message indicating failure is sent to the authenticator 105. If it is determined in step 613 that the user is authentic and authorized to connect, then control passes to step 620.

In step 620, a user class is determined for the user of the host based on the AAA data associated with the user information in step 610. The user class is associated with the local network operations controlled by IP addresses that involve a member of the user class, such as network accounts, QoS, and access control to services such as Internet services. For example, the particular user class of the user of host 122 is determined based on the user profile data 136.

Step 630 represents a decision point that determines whether the AAA data goes directly to the configuration server, as in the first set of embodiments. For example, step 630 determines whether the AAA data are to be sent in message 230 from the RADIUS server. The decision point may be implemented in any manner known in the art. For example, decision point 630 may be implemented as a branch point in a program. Also, the decision point may be made as a design choice to employ only the first set of embodiments or only the second set of embodiments.

In the second set of embodiments, in which AAA data is not sent directly to the configuration server, control passes to step 640. In step 640 AAA data including the user class is sent to the switch 102. For example, the user class is sent to authenticator 105 in a response indicating the host may be connected to the local network.

In the first set of embodiments, in which AAA data is sent directly to the configuration server, control passes to step 650. In step 650, a response, indicating the host may be connected to the local network, is sent to the switch 102. For example, the response 232 is sent to authenticator 105.

In step 660, AAA data is sent directly to the configuration process. For example, data indicating user class is included in a message 230 sent to the DHCP server. In some embodiments of the first set of embodiments, the user class is optional and is not included in the AAA data in the message 230. In such embodiments, step 620 may be omitted.

7.0 Hardware Overview

Figure 7:
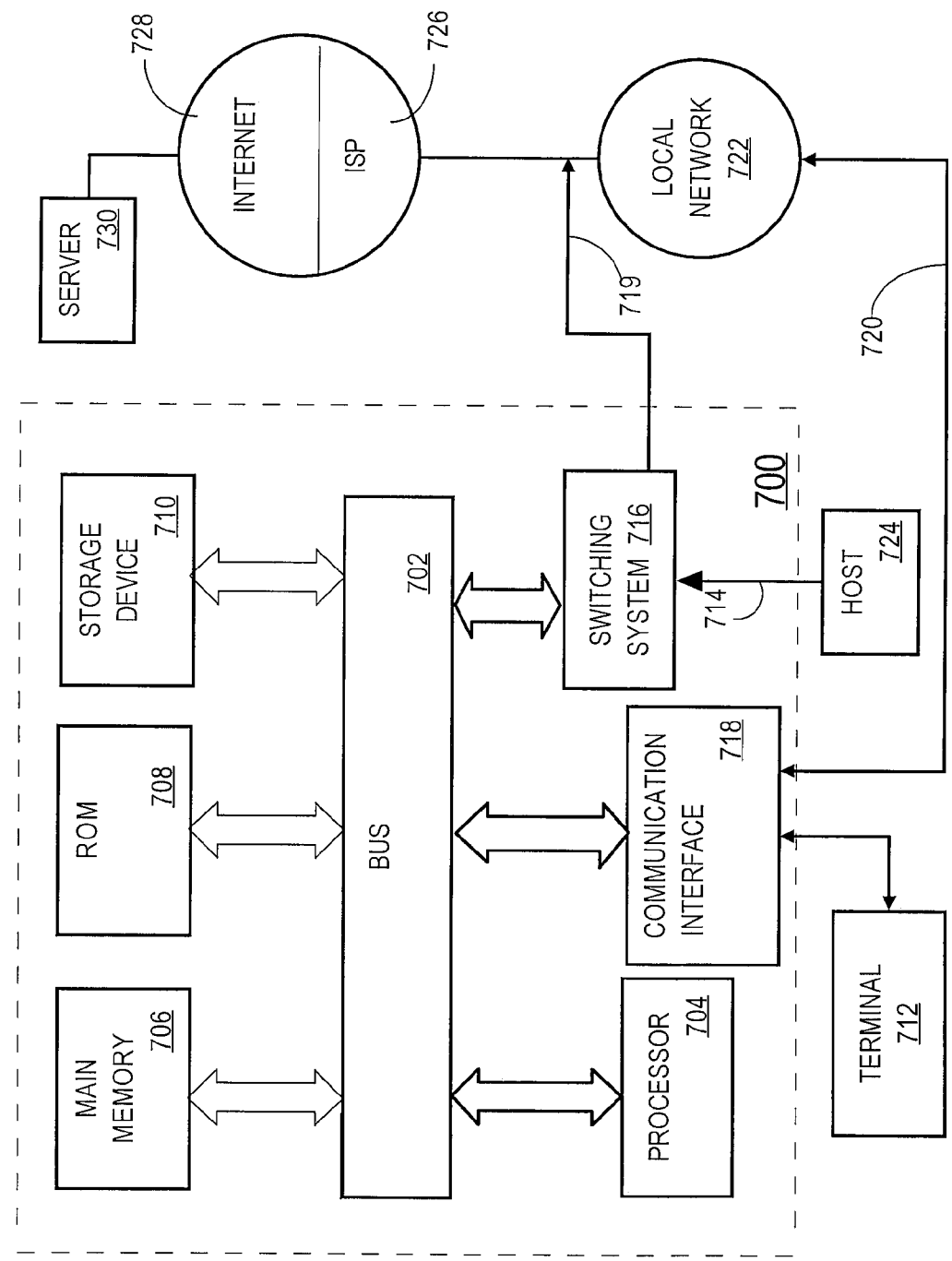
FIG. 7 is a block diagram that illustrates a computer system configured as a switch, upon which an embodiment may be implemented.

FIG. 7 is a block diagram that illustrates a computer system 700 upon which an embodiment of the invention may be implemented. The preferred embodiment is implemented using one or more computer programs running on a network element such as a switch device. Thus, in this embodiment, the computer system 700 is a switch.

Computer system 700 includes a bus 702 or other communication mechanism for communicating information, and a processor 704 coupled with bus 702 for processing information. Computer system 700 also includes a main memory 706, such as a random access memory (RAM), flash memory, or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk, flash memory or optical disk, is provided and coupled to bus 702 for storing information and instructions.

A communication interface 718 may be coupled to bus 702 for communicating information and command selections to processor 704. Interface 718 is a conventional serial interface such as an RS-232 or RS-422 interface. An external terminal 712 or other computer system connects to the computer system 700 and provides commands to it using the interface 714. Firmware or software running in the computer system 700 provides a terminal interface or character-based command interface so that external commands can be given to the computer system.

A switching system 716 is coupled to bus 702 and has an input interface 714 and an output interface 719 to one or more external network elements. The external network elements may include a local network 722 coupled to one or more hosts 724, or a global network such as Internet 728 having one or more servers 730. The switching system 716 switches information traffic arriving on input interface 714 to output interface 719 according to pre-determined protocols and conventions that are well known. For example, switching system 716, in cooperation with processor 704, can determine a destination of a packet of data arriving on input interface 714 and send it to the correct destination using output interface 719. The destinations may include server 730, other end stations, or other routing and switching devices in local network 722 or Internet 728.

The invention is related to the use of computer system 700 for network address assignment based on connection authentication. According to one embodiment of the invention, network address assignment based on connection authentication is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Communication interface 718 also provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with some embodiments of the invention, one such downloaded application provides for a DHCP relay agent or authenticator as described herein.

Processor 704 may execute the received code as it is received, and/or stored in storage device 710, or other non-volatile storage for later execution. In this manner, computer system 700 may obtain application code in the form of a carrier wave.

8.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of assigning a network address to a host based on authentication for a physical connection between the host and an intermediate device, the method comprising the computer-implemented steps of:
    receiving, at a configuration server, from the intermediate device, a first message for discovering a logical network address for the host;
    receiving, at the configuration server, first data that indicates at least some of authentication and authorization information associated with the host, wherein a first server that provides authentication and authorization in response to a request for authentication for the physical connection generated the first data;
    selecting, based at least in part on the first data, a particular pool of one or more logical network addresses from among a plurality of pools of one or more logical network addresses; and
    sending, to the host, a second message including second data indicating a particular network address from the particular pool.

2. A method as recited in claim 1, wherein the first message includes the first data.

3. A method as recited in claim 1, wherein receiving the first data comprises receiving, at the configuration server, the first data directly from the first server.

4. A method as recited in claim 3, further comprising the step of correlating the first message and the first data.

5. A method as recited in claim 4, wherein:
    the first message includes a unique identification for the host;
    the first data includes the unique identification for the host; and
    the step of correlating the first message and the first data is based, at least in part, on the unique identification for the host.

6. A method as recited in claim 5, wherein the unique identification for the host is a media access control address.

7. A method as recited in claim 1, wherein each pool of the plurality of pools is associated with a corresponding group of a plurality of groups of one or more authorized users of the host.

8. A method as recited in claim 7, wherein the first data includes user class data indicating a particular group of the plurality of groups.

9. A method as recited in claim 1, wherein the particular pool is associated with a privilege to access an Internet through a gateway process.

10. A method as recited in claim 1, wherein the first server is a RADIUS protocol server and the configuration server is a DHCP server.

11. A method of assigning a network address to a host based on authentication for a physical connection between the host and an intermediate device, the method comprising the computer-implemented steps of:
    receiving, from the intermediate device, at an authorization server on a network connected to the intermediate device, a request for authenticating the host, the request including information provided from the host;
    determining, at the authorization server, whether the host is authentic and authorized to connect to the network based, at least in part, on the request and user profile data;
    in response to determining that the host is authentic and authorized to connect to the network, sending, from the authorization server, to the intermediate device, a response indicating that the host is authentic and authorized; and
    sending, from the authorization server, to a configuration server, first data that indicates at least some of authentication and authorization information associated with the host, wherein the configuration server provides a logical network address for the host.

12. A method as recited in claim 11, wherein:
    the response includes data indicating a particular group of one or more users authorized for a particular set of network operations;
    each network operation in the particular set is controlled by a logical network address of a host of a user; and
    the group includes the particular user.

13. A method as recited in claim 11, wherein the authorization server is a RADIUS protocol server and the configuration server is a DHCP server.

14. An apparatus for assigning a network address to a host based on authentication for a physical connection between the host and an intermediate device, comprising:
    a network interface that is coupled to a data network for receiving one or more packet flows therefrom;
    a physical connection that is coupled to the host;
    one or more processors;
    instructions which, when executed by the one or more processors, cause the one or more processors to perform the steps of:
        receiving, at a configuration server, from the intermediate device, a first message for discovering a logical network address for the host;
        receiving, at the configuration server, first data that indicates at least some of authentication and authorization information associated with the host, wherein a first server that provides authentication and authorization in response to a request for authentication for the physical connection generated the first data;
        selecting, based at least in part on the first data, a particular pool of one or more logical network addresses from among a plurality of pools of one or more logical network addresses; and
        sending, to the host, a second message including second data indicating a particular network address from the particular pool.

15. An apparatus as recited in claim 14, wherein the first message includes the first data.

16. An apparatus as recited in claim 14, wherein receiving the first data comprises receiving, at the configuration server, the first data directly from the first server.

17. An apparatus as recited in claim 16, wherein the instructions include additional instructions which, when executed by the one or more processors, further cause the one or more processors to perform the step of correlating the first message and the first data.

18. An apparatus as recited in claim 17, wherein:
the first message includes a unique identification for the host;
the first data includes the unique identification for the host; and
the step of correlating the first message and the first data is based, at least in part, on the unique identification for the host.

19. An apparatus as recited in claim 18, wherein the unique identification for the host is a media access control address.

20. An apparatus as recited in claim 14, wherein each pool of the plurality of pools is associated with a corresponding group of a plurality of groups of one or more authorized users of the host.

21. An apparatus as recited in claim 20, wherein the first data includes user class data indicating a particular group of the plurality of groups.

22. An apparatus as recited in claim 14, wherein the particular pool is associated with a privilege to access an Internet through a gateway process.

23. An apparatus as recited in claim 14, wherein the first server is a RADIUS protocol server and the configuration server is a DHCP server.

24. An apparatus for assigning a network address to a host based on authentication for a physical connection between the host and an intermediate device, comprising:
a network interface that is coupled to a data network for receiving one or more packet flows therefrom;
a physical connection that is coupled to the host;
one or more processors;
one or more instructions which, when executed by the one or more processors, cause the one or more processors to perform the steps of:
receiving, from the intermediate device, at an authorization server on a network connected to the intermediate device, a request for authenticating the host, the request including information provided from the host;
determining, at the authorization server, whether the host is authentic and authorized to connect to the network based, at least in part, on the request and user profile data;
in response to determining that the host is authentic and authorized to connect to the network, sending, from the authorization server, to the intermediate device, a response indicating that the host is authentic and authorized; and
sending, from the authorization server, to a configuration server, first data that indicates at least some of authentication and authorization information associated with the host, wherein the configuration server provides a logical network address for the host.

25. An apparatus as recited in claim 24, wherein:
the response includes data indicating a particular group of one or more users authorized for a particular set of network operations;
each network operation in the particular set is controlled by a logical network address of a host of a user; and
the group includes the particular user.

26. An apparatus as recited in claim 24, wherein the authorization server is a RADIUS protocol server and the configuration server is a DHCP server.

* * * * *